(12) United States Patent
Shimazawa et al.

(10) Patent No.: US 8,014,101 B2
(45) Date of Patent: Sep. 6, 2011

(54) NEAR-FIELD LIGHT GENERATOR PLATE, THERMALLY ASSISTED MAGNETIC HEAD, HEAD GIMBAL ASSEMBLY, AND HARD DISK DRIVE

(75) Inventors: Koji Shimazawa, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 929 days.

(21) Appl. No.: 12/003,031

(22) Filed: Dec. 19, 2007

(65) Prior Publication Data

US 2008/0198496 A1 Aug. 21, 2008

(30) Foreign Application Priority Data

Dec. 25, 2006 (JP) ................................ 2006-348253

(51) Int. Cl.
*G11B 5/187* (2006.01)
(52) U.S. Cl. .................................. 360/125.31
(58) Field of Classification Search ............. 360/125.75, 360/125.31, 125.32, 125.71, 125.3, 110, 360/125.74
See application file for complete search history.

(56) References Cited

U.S. PATENT DOCUMENTS

| | | | | |
|---|---|---|---|---|
| 4,725,727 A | * | 2/1988 | Harder et al. | 250/227.28 |
| 6,104,030 A | * | 8/2000 | Chiba et al. | 850/57 |
| 6,649,894 B2 | | 11/2003 | Matsumoto et al. | |
| 6,768,556 B1 | | 7/2004 | Matsumoto et al. | |
| 6,794,296 B1 | * | 9/2004 | Kassing et al. | 438/706 |
| 7,312,445 B2 | * | 12/2007 | Lapchuk et al. | 250/306 |
| 7,529,158 B2 | | 5/2009 | Matsumoto et al. | |
| 7,911,883 B2 | * | 3/2011 | Sasaki et al. | 369/13.33 |
| 2003/0066944 A1 | | 4/2003 | Matsumoto et al. | |
| 2003/0128452 A1 | * | 7/2003 | McDaniel et al. | 360/59 |
| 2004/0085862 A1 | * | 5/2004 | Matsumoto et al. | 369/13.33 |
| 2007/0139818 A1 | * | 6/2007 | Shimazawa et al. | 360/126 |
| 2009/0207703 A1 | | 8/2009 | Matsumoto et al. | |

FOREIGN PATENT DOCUMENTS

| | | |
|---|---|---|
| JP | A-2001-255254 | 9/2001 |
| JP | A-2003-114184 | 4/2003 |
| JP | A-2004-151046 | 5/2004 |

OTHER PUBLICATIONS

T. Matsumoto et al.; "Near-Field Optical Probe with a Beaked Metallic Plate for Thermally Assisted Magnetic Recording"; MORIS2006 Workshop; Technical Digest, Jun. 6-8, 2003; p. 6-7.

* cited by examiner

*Primary Examiner* — Julie Anne Watko
(74) *Attorney, Agent, or Firm* — Oliff & Berridge, PLC

(57) ABSTRACT

A near-field light generator plate 36 of the present invention is arranged to face a medium 10, and one portion 36b and other portion 36a in a medium-facing surface S thereof are made of their respective electroconductive materials different from each other. Since the one portion and the other portion in the medium-facing surface are made of the electroconductive materials different from each other, this medium-facing surface is formed by a surface removing step such as polishing or etching from the medium-facing surface side so that a difference between heights of the one portion and the other portion is readily made based on the difference of the materials.

13 Claims, 12 Drawing Sheets

TRACK WIDTH DIRECTION

NEAR-FIELD LIGHT GENERATOR PLATE, THERMALLY ASSISTED MAGNETIC HEAD, HEAD GIMBAL ASSEMBLY, AND HARD DISK DRIVE

BACKGROUND OF THE INVENTION

1. Field of the Invention

The present invention relates to a near-field light generator plate, a thermally assisted magnetic head for writing of signals by thermally assisted magnetic recording, a head gimbal assembly (HGA) with this thermally assisted magnetic head, and a hard disk drive with this HGA.

2. Related Background Art

As the recording density of the hard disk drive increases, further improvement is demanded in the performance of the thin film magnetic head. In order to increase the recording density, a recording medium is made of a magnetic material with large $K_U$ and the so-called thermally assisted magnetic recording is proposed as a method of applying heat to the recording medium right before application of a writing magnetic field to lower the coercivity of the magnetic material, and then performing writing.

As examples of such thermally-assisted magnetic head recording apparatus, Japanese Patent Application Laid-Open No. 2001-255254 and Japanese Patent Application Laid-Open No. 2003-114184 and T. Matsumoto et al., Near-Field Optical Probe with A Beaked Metallic Plate for Thermally Assisted Magnetic Recording, pp. 6-7, MORIS2006 WORKSHOP Technical Digest, Jun. 6-8, 2003 disclose the thermally-assisted magnetic heads in which an electroconductive near-field light generator plate of a plate shape is disposed on a medium-facing surface and in which light is guided onto the near-field light generator plate from the back side to generate near-field light. Particularly, Japanese Patent Application Laid-Open No. 2003-114184 and T. Matsumoto et al., Near-Field Optical Probe with A Beaked Metallic Plate for Thermally Assisted Magnetic Recording, pp. 6-7, MORIS2006 WORKSHOP Technical Digest, Jun. 6-8, 2003 disclose the structure in which a part of the near-field light generator plate is projected toward the medium, and it is considered that in this structure the near-field light is selectively radiated at high intensity from the projected part toward the medium.

SUMMARY OF THE INVENTION

The above-cited Documents, however, failed to disclose the details about how to make a desired portion of the near-field light generator plate projected toward the medium.

An object of the present invention is therefore to provide a near-field light generator plate any desired portion of which can be readily projected toward the medium, a thermally assisted magnetic head, an HGA with this thermally assisted magnetic head, and a hard disk drive with this HGA.

A near-field light generator plate according to the present invention is a near-field light generator plate which is arranged so that a principal surface thereof faces a medium, and in which one portion and other portion in the principal surface are made of respective electroconductive materials different from each other.

According to the present invention, the one portion and the other portion in the principal surface or the medium-facing surface of the near-field generator plate are made of their respective electroconductive materials different from each other. Therefore, this medium-facing surface is formed by a surface removing step such as polishing or etching from the medium-facing surface side whereby a difference between heights of surfaces of the one portion and the other portion can be readily formed based on a difference between physical properties of the materials. It is thus easy to control degrees of projections of the respective portions toward the medium in the near-field light generator plate, and the near-field light generator plate is readily obtained in a form where a desired portion in the medium-facing surface is selectively projected toward the medium.

Preferably, each of the electroconductive materials is a metal or an alloy of two or more metals selected from a metal group consisting of Pd, Pt, Rh, Ir, Ru, Au, Ag, Cu, and Al. This configuration achieves the effect that the surface plasmon is effectively induced in the wavelength region of visible light to generate the near-field light.

Preferably, the electroconductive material of the one portion has a higher hardness or a lower etching speed than the electroconductive material of the other portion. This makes it easy to make the height of the surface of the one portion higher than that of the other portion by a surface removing step such as polishing or etching.

Preferably, the one portion is projected more toward the medium than the other portion. Since electric charge is concentrated particularly in the projected portion, the near-field light can be selectively radiated from this projected portion toward the medium, which increases the recording density.

Preferably, when viewed from a direction normal to the medium-facing surface, the one portion has a cusp portion, whereby the near-field light is selectively radiated particularly from the tip of the cusp portion of the one portion. In a preferred configuration the one portion has only one cusp portion.

Preferably, the one portion is made of AuCu and the other portion is made of Au.

A thermally assisted magnetic head according to the present invention is a thermally assisted magnetic head comprising: a magnetic pole for generating a magnetic field, which is exposed in a medium-facing surface; a waveguide for receiving light from the outside and guiding the light to the medium-facing surface; and the above-described near-field light generator plate disposed on a medium-facing surface of the waveguide.

Another thermally assisted magnetic head according to the present invention is a thermally assisted magnetic head comprising: a magnetic pole for generating a magnetic field, which is exposed in a medium-facing surface; a waveguide for receiving light from the outside and guiding the light to the medium-facing surface; and the above-described near-field light generator plate disposed on a medium-facing surface of the waveguide; wherein in the medium-facing surface, the one portion of the near-field light generator plate is closer to the magnetic pole than the other portion thereof. In this configuration, the one portion from which the near-field light is selectively radiated in the near-field light generator plate, becomes closer to the magnetic pole, so as to shorten a time from heating of the medium with the near-field light to application of a recording magnetic field, whereby recording magnetism can be applied to the medium before the temperature of the medium heated with the near-field light decreases largely.

A head gimbal assembly according to the present invention is a head gimbal assembly comprising the above-described thermally assisted magnetic head, and a suspension supporting the thermally assisted magnetic head.

A hard disk drive according to the present invention comprises the above-described head gimbal assembly, and a magnetic recording medium.

Since the present invention enables a desired portion of the near-field light generator to be readily projected toward the medium, a spot size of the near-field light can be made smaller and high-density recording can be readily realized by the thermally assisted magnetic recording.

BRIEF DESCRIPTION OF THE DRAWINGS

FIGS. 7(A) and (B) are enlarged views of the near-field light generator plate in FIG. 6, wherein FIG. 7(A) is a plan view from the medium-facing surface and FIG. 7(B) is a horizontal sectional view of FIG. 7(A).

DESCRIPTION OF THE PREFERRED EMBODIMENTS

Figure 1A:
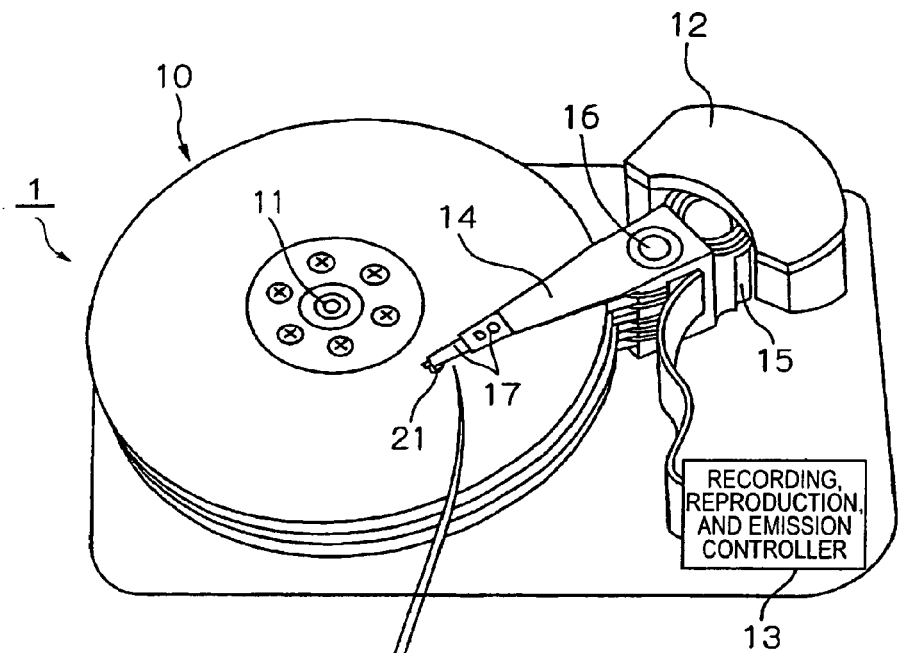
FIGS. 1(A) and (B) are perspective views schematically showing a configuration of a major part in an embodiment of a hard disk drive and HGA according to the present invention.

Embodiments for carrying out the present invention will be described below in detail with reference to the accompanying drawings. In each of the drawings, the same elements will be denoted by the same reference numerals. It is also noted that the dimensional ratios in and between the constituent elements in the drawings are arbitrary, for easier understanding of the drawings.

Figure 2:
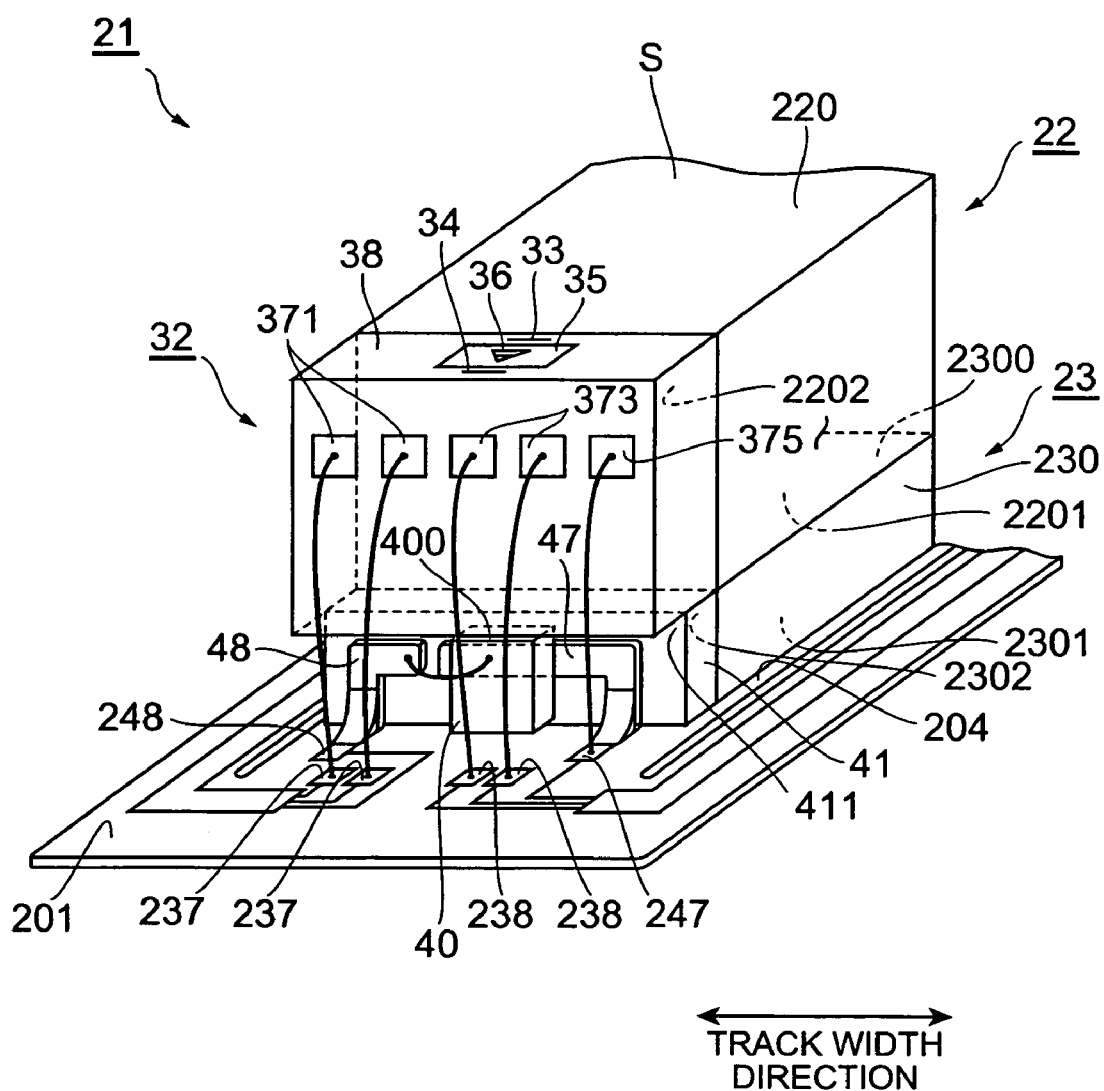
FIG. 2 is an enlarged perspective view of a part near a distal end of the HGA in FIG. 1.

FIGS. 1(A) and (B) are perspective views schematically showing a configuration of a major part in an embodiment of the hard disk drive and HGA (head gimbal assembly) according to the present invention. FIG. 2 is an enlarged perspective view of a part near a thermally assisted magnetic head 21 in FIGS. 1(A) and (B). In the perspective view of the HGA, the side of the HGA facing a surface of a magnetic disk is illustrated up.

(Hard Disk Drive)

Figure 1B:
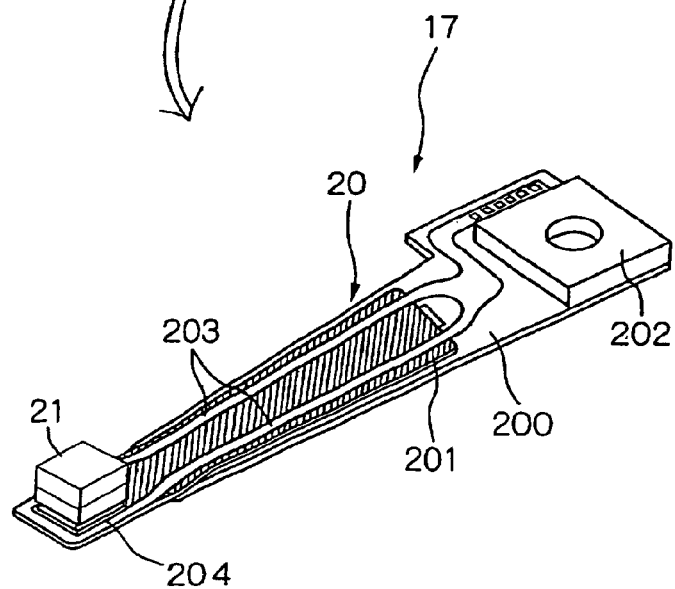

In (A) of FIG. 1, the hard disk drive 1 has magnetic disks (recording medium) 10 consisting of a plurality of magnetic recording media to rotate around a rotation shaft of spindle motor 11, an assembly carriage device 12 for positioning each thermally assisted magnetic head 21 on a track, and a recording, reproduction, and emission control circuit (control circuit) 13 for controlling writing and reading operations of each thermally assisted magnetic head 21 and for controlling a laser diode as a light source for emitting laser light for thermally assisted magnetic recording, which will be detailed later.

The assembly carriage device 12 is provided with a plurality of drive arms 14. These drive arms 14 are angularly rockable around a pivot bearing shaft 16 by voice coil motor (VCM) 15, and are stacked in the direction along this shaft 16. An HGA 17 is attached to the distal end of each drive arm 14. Each HGA 17 is provided with a thermally assisted magnetic head 21 so that it faces the surface of each magnetic disk 10. The surface of the magnetic head 21 facing the surface of the magnetic disk 10 is a medium-facing surface S (which is also called an air bearing surface) of the thermally assisted magnetic head 21. The number of each of magnetic disks 10, drive arms 14, HGAs 17, and thermally assisted magnetic heads 21 may be one.

(HGA)

The HGA 17 is constructed, as shown in (B) of FIG. 1, by fixing the thermally assisted magnetic head 21 to a distal end of suspension 20 and electrically connecting one end of wiring member 203 to terminal electrodes of the thermally assisted magnetic head 21. The suspension 20 is composed mainly of a load beam 200, a flexure 201 with elasticity fixed and supported on this load beam 200, a tongue portion 204 formed in a plate spring shape at the tip of the flexure, a base plate 202 disposed on the base part of the load beam 200, and a wiring member 203 disposed on the flexure 201 and consisting of a lead conductor and connection pads electrically connected to the both ends of the lead conductor.

The wiring member, as shown in FIG. 2, has a pair of electrode pads 237, 237 for recording signal, a pair of electrode pads 238, 238 for readout signal, and a pair of electrode pads 247, 248 for driving of the light source.

It is obvious that the structure of the suspension in the HGA 17 of the present invention is not limited to the above-described structure. An IC chip for driving of the head may be mounted midway in the suspension 20, though not shown.

(Thermally Assisted Magnetic Head)

Figure 3:
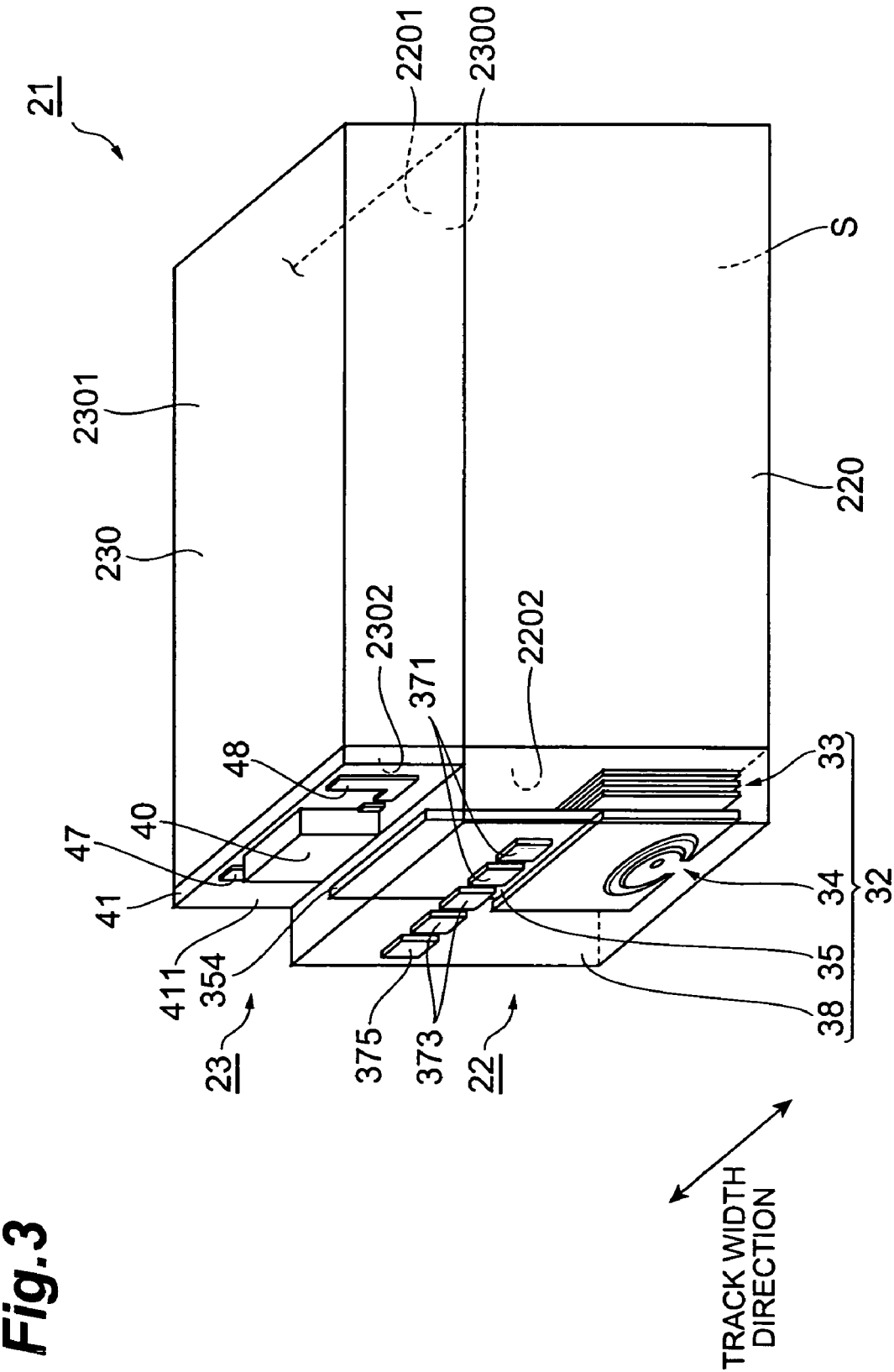
FIG. 3 is a perspective view schematically showing a configuration of a thermally assisted magnetic head in FIG. 1.
Figure 4:
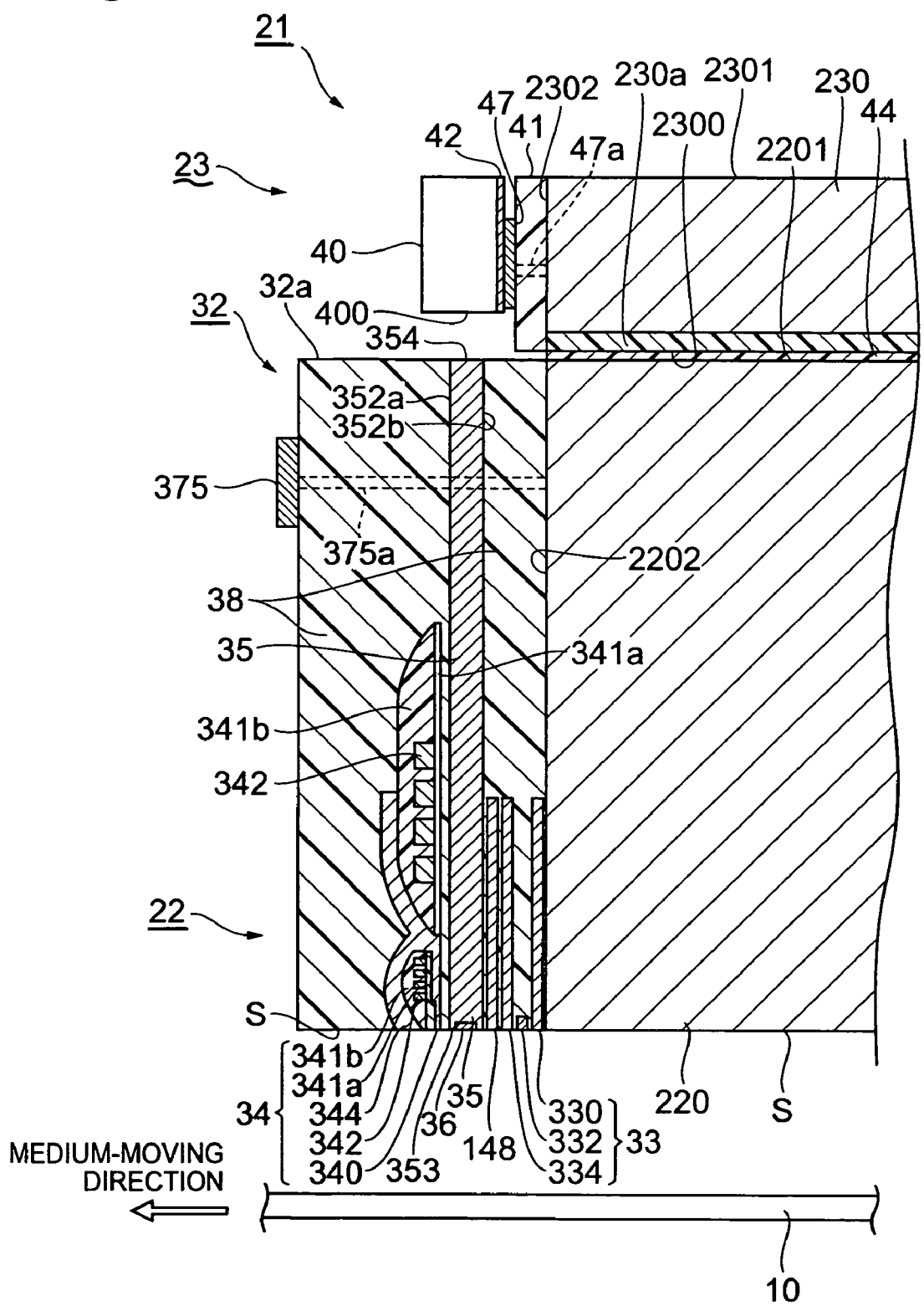
FIG. 4 is a sectional view perpendicular to a medium-facing surface of the thermally assisted magnetic head in FIG. 3.

As shown in FIGS. 2 to 4, the thermally assisted magnetic head 21 has a configuration in which a slider 22, and a light source unit 23 having a light source support substrate 230 and a laser diode 40 as a light source for thermally assisted magnetic recording are bonded and fixed to each other so that a back surface 2201 of a slider substrate 220 is in contact with a bond surface 2300 of the light source support substrate 230. The back surface 2201 of the slider substrate 220 herein is a surface opposite to the medium-facing surface S of the slider 22. A bottom surface 2301 of the light source support substrate 230 is bonded to the tongue portion 204 of the flexure 201, for example, with an adhesive such as epoxy resin.

(Slider)

The slider 22 has a slider substrate 220, and a magnetic head portion 32 for performing writing and reading of data signal.

The slider substrate 220 is of a plate shape and has the medium-facing surface S processed so as to achieve an appropriate levitation amount. The slider substrate 220 is made of electrically conductive AlTiC ($Al_2O_3$—TiC) or the like.

The magnetic head portion 32 is formed on an integration surface 2202 which is a side surface approximately perpendicular to the medium-facing surface S of the slider substrate 220. The magnetic head portion 32 has an MR effect element (magnetic detecting element) 33 as a magnetic detecting element for detecting magnetic information, an electromagnetic coil element (magnetic recording element) 34 as a perpendicular (or, possibly, longitudinal) magnetic recording element for writing magnetic information by generation of a magnetic field, a waveguide 35 as a planar waveguide provided through between the MR effect element 33 and the electromagnetic coil element 34, a near-field light generator plate 36 for generating near-field light for heating a recording layer portion of a magnetic disk, an insulating layer 38 formed on the integration surface 2202 so as to cover these MR effect element 33, electromagnetic coil element 34, waveguide 35, and near-field light generator plate 36, a pair of electrode pads 371, 371 for signal terminals exposed from the layer surface of the insulating layer 38 and connected to the MR effect element 33, a pair of electrode pads 373, 373 for signal terminals connected to the electromagnetic coil element 34, and an electrode pad 375 for ground electrically connected to the slider substrate 220. The MR effect element 33, electromagnetic coil element 34, and near-field light generator plate 36 are exposed in the medium-facing surface S. Each of the elements will be described below in detail.

FIG. 4 is a sectional view of the part near the magnetic head portion of the thermally assisted magnetic head 21. As shown in FIG. 4, the MR effect element 33 includes an MR laminate 332, and a lower shield layer 330 and an upper shield layer 334 located at respective positions on both sides of this MR laminate 332. The lower shield layer 330 and the upper shield layer 334 can be made, for example, of a magnetic material of NiFe, CoFeNi, CoFe, FeN, FeZrN, or the like and in the thickness of about 0.5-3 μm by a pattern plating method including a frame plating method, or the like. The upper and lower shield layers 334 and 330 prevent the MR laminate 332 from being affected by an external magnetic field serving as noise.

The MR laminate 332 includes a magneto-resistance effect film such as an in-plane conduction type (CIP (Current In Plane)) Giant Magneto Resistance (GMR) multilayer film, a perpendicular conduction type (CPP (Current Perpendicular to Plane)) GMR multilayer film, or a Tunnel Magneto Resistance (TMR) multilayer film, and is sensitive to a signal magnetic field from the magnetic disk with very high sensitivity.

For example, when the MR laminate 332 includes a TMR effect multilayer film, it has a structure in which the following layers are stacked in order: an antiferromagnetic layer made of IrMn, PtMn, NiMn, RuRhMn, or the like and in the thickness of about 5-15 nm; a magnetization fixed layer comprised, for example, of CoFe or the like as a ferromagnetic material, or two layers of CoFe or the like with a nonmagnetic metal layer of Ru or the like in between, and having the magnetization direction fixed by the antiferromagnetic layer; a tunnel barrier layer of a nonmagnetic dielectric material made, for example, by oxidizing a metal film of Al, AlCu, or the like about 0.5-1 nm thick by oxygen introduced into a vacuum chamber, or by native oxidation; and a magnetization free layer comprised, for example, of two layered films of CoFe or the like about 1 nm thick as a ferromagnetic material and NiFe or the like about 3-4 nm thick, and effecting tunnel exchange coupling through the tunnel barrier layer with the magnetization fixed layer.

An interelement shield layer 148 made of the same material as the lower shield layer 330 is formed between the MR effect element 33 and the waveguide 35. The interelement shield layer 148 performs a function of shielding the MR effect element 33 from a magnetic field generated by the electromagnetic coil element 34 and preventing external noise during readout. A bucking coil portion may also be further formed between the interelement shield layer 148 and the waveguide 35. The bucking coil portion generates a magnetic flux to cancel a magnetic flux loop generated by the electromagnetic coil element 34 and passing via the upper and lower electrode layers of the MR effect element 33, and thereby suppresses the Wide Area Track Erasure (WATE) phenomenon being an unwanted writing or erasing operation on the magnetic disk.

The insulating layer 38 made of alumina or the like is formed between the shield layers 330, 334 on the opposite side to the medium-facing surface S of the MR laminate 332, on the opposite side to the medium-facing surface S of the shield layers 330, 334, 148, between the lower shield layer 330 and the slider substrate 220, and between the interelement shield layer 148 and the waveguide 35.

When the MR laminate 332 includes a CIP-GMR multilayer film, upper and lower shield gap layers for insulation of alumina or the like are provided between each of the upper and lower shield layers 334 and 330, and the MR laminate 332. Furthermore, an MR lead conductor layer for supplying a sense current to the MR laminate 332 to extract reproduction output is formed though not shown. On the other hand, when the MR laminate 332 includes a CPP-GMR multilayer film or a TMR multilayer film, the upper and lower shield layers 334 and 330 also function as upper and lower electrode layers, respectively. In this case, the upper and lower shield gap layers and MR lead conductor layer are unnecessary and omitted.

A hard bias layer of a ferromagnetic material such as CoTa, CoCrPt, or CoPt, for applying a vertical bias magnetic field for stabilization of magnetic domains, is formed on both sides in the track width direction of the MR laminate 332, though not shown.

The electromagnetic coil element 34 is preferably one for perpendicular magnetic recording and, as shown in FIG. 4, has a main magnetic pole layer 340, a gap layer 341a, a coil insulating layer 341b, a coil layer 342, and an auxiliary magnetic pole layer 344 as exposed in the medium-facing surface S.

Figure 5:
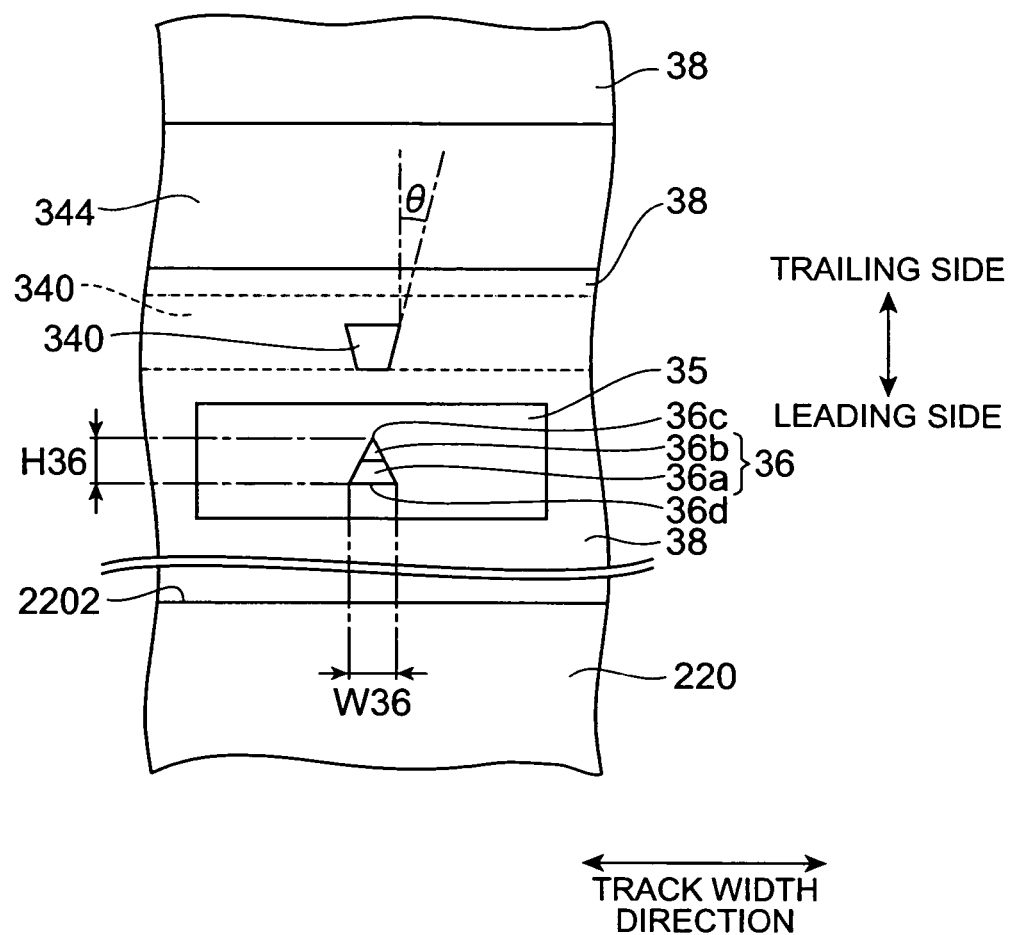
FIG. 5 is a schematic view from the medium-facing surface of the thermally assisted magnetic head in FIG. 4.

The main magnetic pole layer 340 is a magnetic guide for guiding a magnetic flux induced by the coil layer 342, up to the recording layer of the magnetic disk (medium) as a target of writing, while converging the magnetic flux. The end of the main magnetic pole layer 340 on the medium-facing surface S side preferably has a width in the track width direction (depth direction in FIG. 4) and a thickness in the stack direction (horizontal direction in FIG. 4) smaller than those of the other portions. This results in permitting the main magnetic pole layer to generate a fine and strong writing magnetic field adapted for high recording density. Specifically, for example, as shown in FIG. 5 which is a view of the magnetic head portion from the medium-facing surface S side, the tip of the main magnetic pole layer 340 on the medium-facing surface S side is preferably tapered in a shape of an inverted trapezoid whose length of the side on the leading side or slider substrate 220 side is shorter than the length of the side on the trailing side. Namely, the end face of the main magnetic pole layer 340 on the medium-facing surface side is provided with a bevel angle θ, in order to avoid unwanted writing or the like on an adjacent track by influence of a skew angle made by actuation with a rotary actuator. The magnitude of the bevel angle θ is, for example, approximately 15°. In practice, the writing magnetic field is generated mainly near the longer side on the trailing side and in the case of the magnetic dominant recording, the length of this longer side determines the width of the writing track.

Here the main magnetic pole layer 340 is preferably made, for example, in the total thickness of about 0.01 to about 0.5 μm at the end portion on the medium-facing surface S side and in the total thickness of about 0.5 to about 3.0 μm at the portions other than this end portion and, for example, of an alloy of two or three out of Ni, Fe, and Co by frame plating, sputtering, or the like, or an alloy containing the foregoing elements as main ingredients and doped with a predetermined element. The track width can be, for example, 100 nm.

As shown in FIG. 4, the end portion of the auxiliary magnetic pole layer 344 on the medium-facing surface S side forms a trailing shield portion wider in a layer section than the other portion of the auxiliary magnetic pole layer 344. The auxiliary magnetic pole layer 344 is opposed through the gap layer 341a and coil insulating layer 341b made of an insulating material such as alumina, to the end of the main magnetic pole layer 340 on the medium-facing surface S side. When the auxiliary magnetic pole layer 344 of this configuration is provided, the magnetic field gradient becomes steeper between the auxiliary magnetic pole layer 344 and the main magnetic pole layer 340 near the medium-facing surface S. This results in decreasing jitter of signal output and permitting decrease in the error rate during readout.

The auxiliary magnetic pole layer 344 is made, for example, in the thickness of about 0.5 to about 5 μm and, for example, of an alloy of two or three out of Ni, Fe, and Co by frame plating, sputtering, or the like, or an alloy containing these as principal ingredients and doped with a predetermined element.

The gap layer 341a separates the coil layer 342 from the main magnetic pole layer 340 and is made, for example, in the thickness of about 0.01 to about 0.5 μm and, for example, of $Al_2O_3$ or DLC or the like by sputtering, CVD, or the like.

The coil layer 342 is made, for example, in the thickness of about 0.5 to about 3 μm and, for example, of Cu or the like by frame plating or the like. The rear end of the main magnetic pole layer 340 is coupled with the portion of the auxiliary magnetic pole layer 344 apart from the medium-facing surface S and the coil layer 342 is formed so as to surround this coupling portion. The coil layer 342 is one layer in FIG. 4 and others, but may be two or more layers, or a helical coil.

The coil insulating layer 341b separates the coil layer 342 from the auxiliary magnetic pole layer 344 and is made, for example, in the thickness of about 0.1 to about 5 μm and of an electric insulating material such as thermally cured alumina or resist layer or the like.

Figure 6:
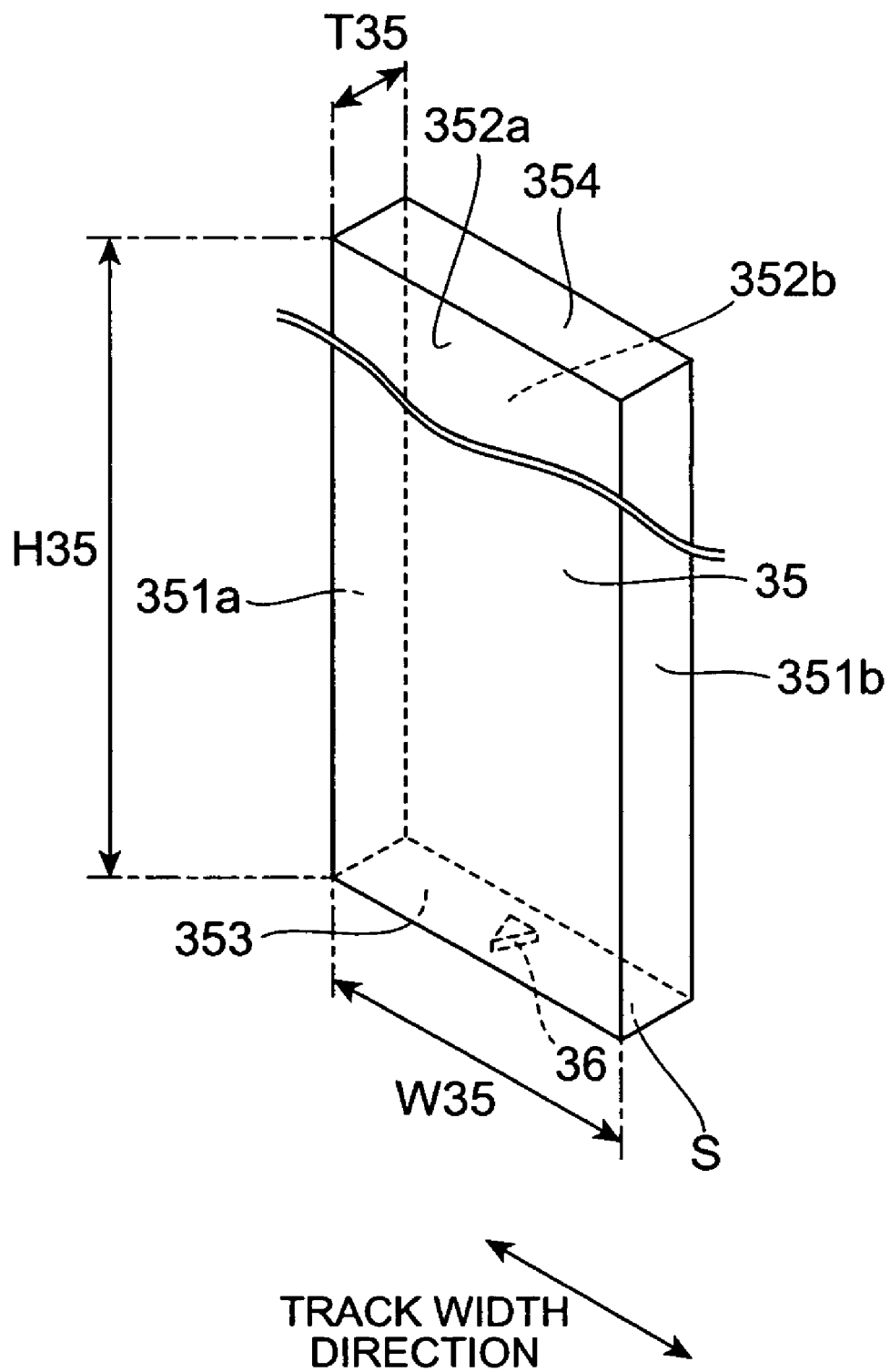
FIG. 6 is a perspective view showing a waveguide and a near-field light generator plate in the thermally assisted magnetic head in FIG. 3.

The waveguide 35 is located between the MR effect element 33 and the electromagnetic coil element 34, extends in parallel with the integration surface 2202, extends from the medium-facing surface S of the magnetic head portion 32 to the surface 32a opposite to the medium-facing surface of the magnetic head portion 32, and is of a rectangular plate shape, as shown in FIG. 6. The waveguide 35 has two side faces 351a, 351b opposed in the track width direction, and two upper face 352a and lower face 352b parallel to the integration surface 2202, all of which are formed perpendicularly to the medium-facing surface S, and the waveguide 35 also has an exit face 353 forming the medium-facing surface S, and an entrance face (end face) 354 opposite to the exit face 353. The upper face 352a, the lower face 352b, and the two side faces 351a, 351b of the waveguide 35 are in contact with the insulating layer 38 having the refractive index smaller than that of the waveguide 35 and functioning as a cladding for the waveguide 35.

This waveguide 35 is able to guide light incident through the entrance face 354, to the exit face 353 as the end face on the medium-facing surface S side, while reflecting the light on the two side faces 351a, 351b, the upper face 352a, and the lower face 352b. The width W35 of the waveguide 35 in the track width direction in FIG. 6 can be, for example, 1-200 μm, the thickness T35, for example, 2-10 μm, and the height H35 10-300 μm.

The waveguide 35 is made, for example, by sputtering or the like, from a dielectric material which has the refractive index n higher than that of the material making the insulating layer 38, everywhere. For example, in a case where the insulating layer 38 is made of $SiO_2$ (n=1.5), the waveguide 35 may be made of $Al_2O_3$ (n=1.63). Furthermore, in a case where the insulating layer 38 is made of $Al_2O_3$ (n=1.63), the waveguide 35 may be made of $Ta_2O_5$ (n=2.16), $Nb_2O_5$ (n=2.33), TiO (n=2.3-2.55), or $TiO_2$ (n=2.3-2.55). When the waveguide 35 is made of one of such materials, the total reflection condition is met at the interface, in addition to the good optical characteristics of the material itself, so as to decrease the propagation loss of laser light and increase the efficiency of generation of near-field light.

The near-field light generator plate 36, as shown in FIGS. 2, and 4 to 7, is a platelike member disposed nearly in the center of the exit face 353 of the waveguide 35. As shown in FIGS. 4 and 6, the near-field light generator plate 36 is buried in the exit face 353 of the waveguide 35 so that the principal face thereof is exposed in the medium-facing surface S to face the medium. As shown in FIG. 5, the near-field light generator plate 36 is of a triangular shape when viewed from the medium-facing surface S, and is made of an electroconductive material. The electroconductive material can be one selected from metals and alloys such as Au, and others.

A base 36d of the triangle is arranged in parallel with the integration surface 2202 of the slider substrate 220 or in parallel with the track width direction, and a pointed cusp portion 36c opposed to the base 36d is arranged on the main magnetic pole layer 340 side of the electromagnetic coil element 34 with respect to the base 36d; specifically, the cusp portion 36c is arranged opposite to the leading edge of the main magnetic pole layer 340. A preferred form of the near-field light generator plate 36 is an isosceles triangle whose two base angles at the two ends of the base 36d are equal to each other.

In the near-field light generator plate 36, as shown in FIGS. 5 and 7, an electroconductive layer 36a (other portion) farther from the main magnetic pole 340 and an electroconductive layer 36b (one portion) closer to the main magnetic pole 340 are made of their respective electroconductive materials different from each other. The "materials different from each other" means that their compositions are different, and the different compositions enable the electroconductive layer 36a (other portion) farther from the main magnetic pole 340 and the electroconductive layer 36b (one portion) closer to the main magnetic pole 340 to have different surface removal speeds such as polishing speeds or etching speeds. Specifically, each of the electroconductive layers 36a, 36b of the near-field light generator plate 36 is preferably made of a metal or an alloy of two or more metals selected from the group consisting of Pd, Pt, Rh, Ir, Ru, Au, Ag, Cu, and Al.

The electroconductive layer 36b closer to the main magnetic pole 340 in the near-field light generator plate preferably includes a pointed cusp portion 36c as a place for selectively generating the near-field light and, particularly, more preferably has only one cusp portion. In FIG. 5, the radius of curvature at the tip of the cusp portion 36c is preferably 5-100 nm.

The height H36 of the triangle is sufficiently smaller than the wavelength of incident laser light and is preferably 20-400 nm. The width W36 of the base 36d is sufficiently smaller than the wavelength of incident laser light and is preferably 20-400 nm.

Figure 7A:
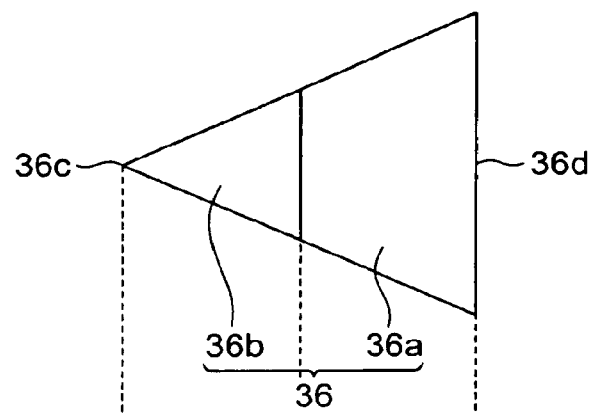
Figure 7B:
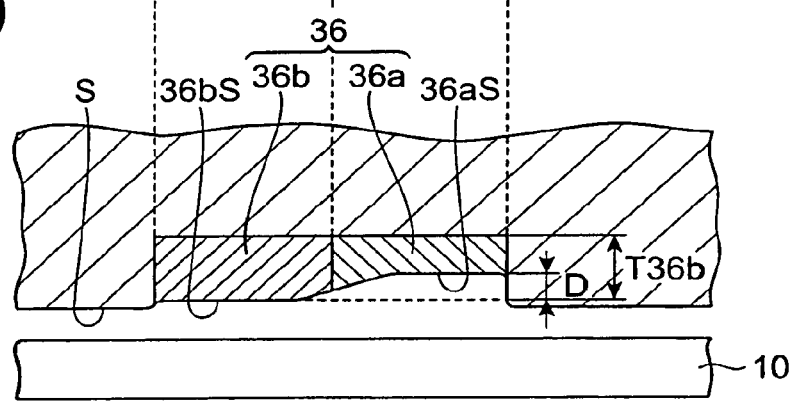

In the present embodiment, particularly as shown in FIGS. 7(A) and (B), a medium-facing surface 36bS of the electroconductive layer 36b closer to the main magnetic pole 340 is projected more toward the medium 10 than a medium-facing surface 36aS of the electroconductive layer 36a farther from the main magnetic pole 340. For example, a thickness T36b of the electroconductive layer 36b closer to the main magnetic pole 340 can be, for example, 10-100 nm and a level difference D between the medium-facing surface 36aS and the medium-facing surface 36bS can be, for example, 5-50 nm.

When the near-field light generator plate 36 is disposed on the exit face 353 of the waveguide 35, the electric field is concentrated near the cusp portion 36c in the electroconductive layer 36b of the near-field light generator plate 36 and the near-field light is selectively generated from near the cusp portion 36c toward the medium. This will be detailed later.

In this slider 22, as shown in FIG. 2, the electrode pads 371, 371 are electrically connected through bonding wires to the respective electrode pads 237, 237 of the flexure 201, and the electrode pads 373, 373 are connected through bonding wires to the respective electrode pads 238, 238 of the flexure 201; this configuration allows each of the electromagnetic coil element and the MR effect element to be driven. The electrode pad 375 electrically connected through a via hole 375a in FIG. 4 to the slider substrate 220 is connected through a bonding wire to the electrode pad 247 of the flexure 201, as shown in FIG. 2, whereby a potential of the slider substrate 220 can be controlled, for example, to the ground potential by the electrode pad 247.

(Light Source Unit)

The components of the light source unit 23 in the thermally assisted magnetic head 21 will be described below.

As shown in FIGS. 2 to 4, the light source unit 23 mainly has a light source support substrate 230 and a laser diode (light source) 40 whose contour is platelike.

The light source support substrate 230 is a substrate of AlTiC ($Al_2O_3$—TiC) or the like and has the bond surface 2300 bonded to the back surface 2201 of the slider substrate 220. As shown in FIG. 4, a heat insulation layer 230a of alumina or the like is formed on the bond surface 2300. An insulating layer 41 of an insulating material such as alumina is disposed on an element forming surface 2302 being one side surface when the bond surface 2300 is regarded as a bottom surface. The electrode pads 47, 48 are formed on this insulating layer 41, and the laser diode 40 is fixed on the electrode pad 47.

More specifically, as shown in FIGS. 2 and 3, the electrode pads 47, 48 are formed for driving of laser, on a surface 411 intersecting with the front surface of the insulating layer 41 and with the medium-facing surface S and, in other words, they are formed on the surface 411 parallel to the integration surface 2202 of the slider substrate 220. The electrode pad 47, as shown in FIG. 4, is electrically connected through a via hole 47a provided in the insulating layer 41, to the light source support substrate 230. The electrode pad 47 also functions as a heat sink for leading heat during driving of the laser diode 40 through the via hole 47a to the light source support substrate 230 side.

The electrode pad 47, as shown in FIG. 2, is formed so as to extend in the track width direction in the central region of the surface 411 of the insulating layer 41. On the other hand, the electrode pad 48 is formed at a position separate in the track width direction from the electrode pad 47. Each of the electrode pads 47, 48 further extends toward the flexure 201 side, for connection with the flexure 201 by solder reflow.

The electrode pads 47, 48 are electrically connected to the electrode pads 247, 248 of the flexure 201, respectively, by reflow soldering, whereby the light source can be driven. Since the electrode pad 47 is electrically connected to the light source support substrate 230 as described above, the potential of the light source support substrate 230 can be controlled, for example, to the ground potential by the electrode pad 247.

The electrode pads 47, 48 can be comprised, for example, of layers of Au, Cu, or the like made in the thickness of about 1-3 μm and by vacuum evaporation, sputtering, or the like, which are formed, for example, through a ground layer of Ta, Ti, or the like about 10 nm thick.

The laser diode 40 is electrically connected onto the electrode pad 47 by a solder layer 42 (cf. FIG. 4) of an electrically conductive solder material such as Au—Sn. At this time, the laser diode 40 is located relative to the electrode pad 47 so as to cover only a part of the electrode pad 47.

Figure 8:
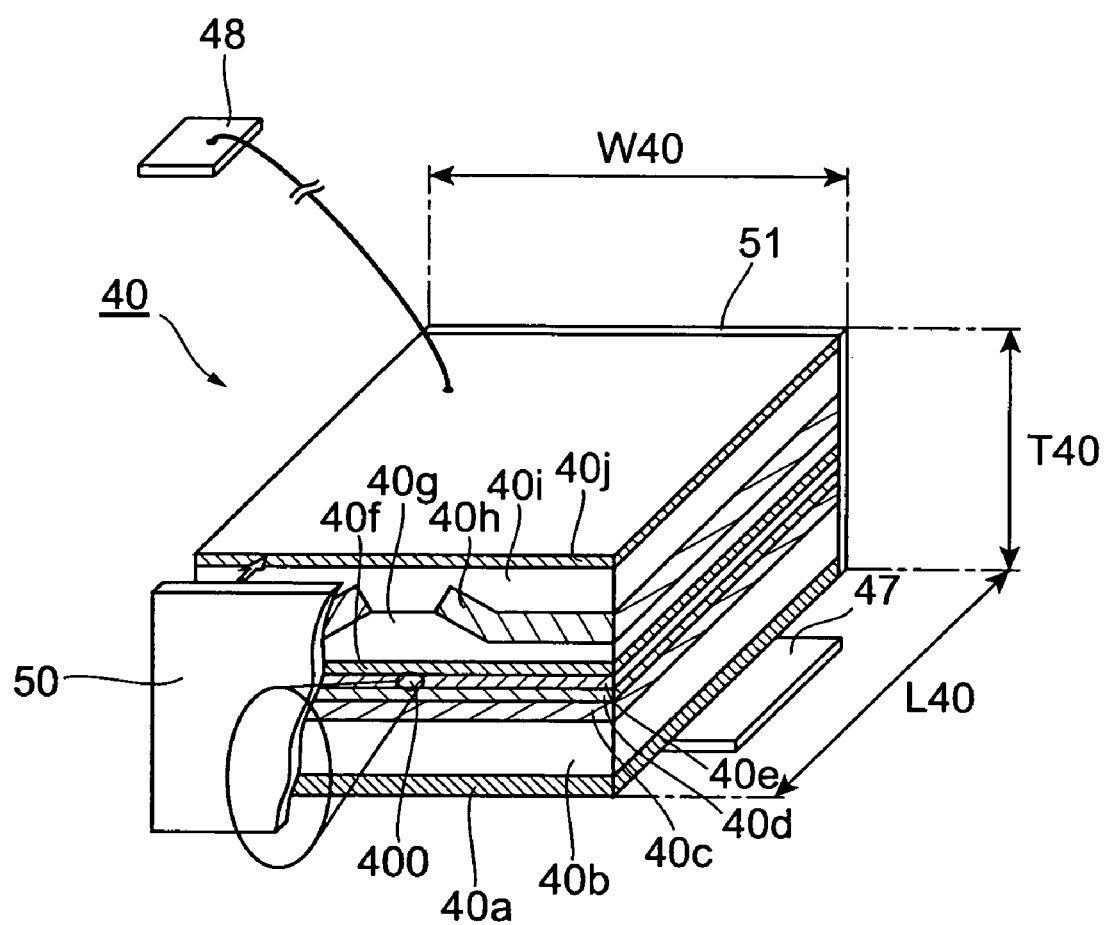
FIG. 8 is a schematic perspective view showing a configuration of a laser diode.
Figure 9A:
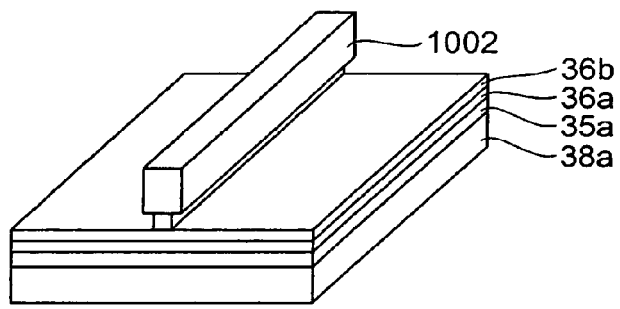
FIGS. 9(A)-(D) are perspective views showing a production method of the waveguide and the near-field light generator plate in order of FIGS. 9(A)-(D).
Figure 9B:
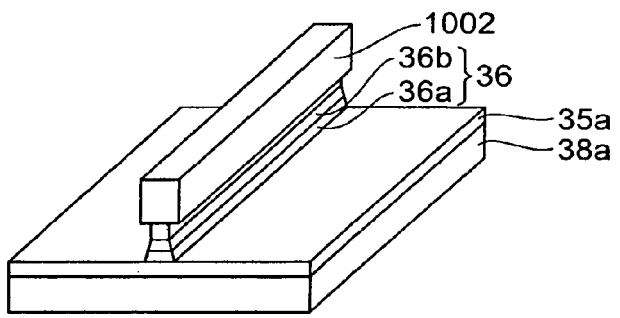
Figure 9C:
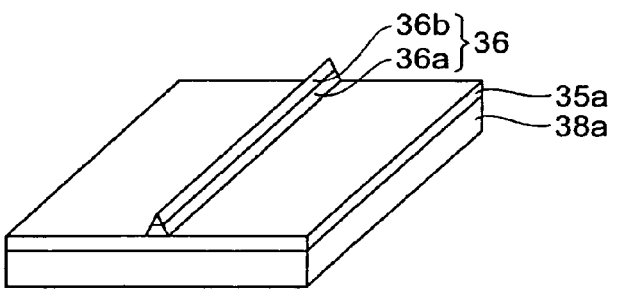
Figure 9D:
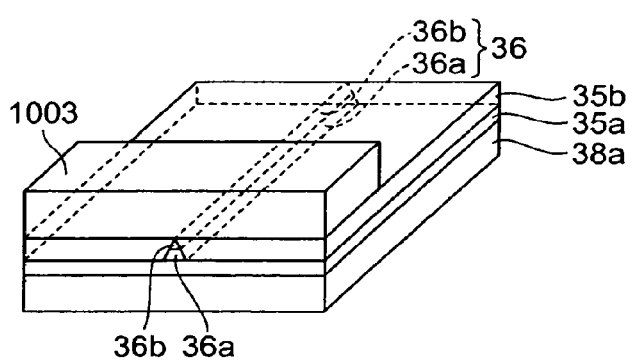

As shown in FIG. 8, the laser diode 40 may have the same structure as the one normally used for an optical disk storage, and, for example, has a structure in which the following layers are stacked in order: an n-electrode 40a; an n-GaAs substrate 40b; an n-InGaAlP cladding layer 40c; a first InGaAlP guide layer 40d; an active layer 40e consisting of multiple quantum wells (InGaP/InGaAlP) or the like; a second InGaAlP guide layer 40f; a p-InGaAlP cladding layer 40g; an *n-GaAs current blocking layer 40h; a p-GaAs contact layer 40i; a p-electrode 40j. Reflecting films 50 and 51 of $SiO_2$, $Al_2O_3$, or the like for exciting oscillation by total reflection are deposited before and after cleavage faces of the multilayer structure, and an aperture is provided at the position of the active layer 40e in one reflecting film 50, at an output end 400 for emission of laser light. The laser diode 40 of this configuration emits laser light from the output end 400 when a voltage is applied thereto in the film thickness direction.

The wavelength $\lambda_L$ of the emitted laser light is, for example, approximately 600-650 nm. It should be, however, noted that there is an appropriate excitation wavelength according to the metal material of the near-field light generator plate 36 (FIG. 2). For example, in a case where either of Au and an alloy thereof is used for the near-field light generator plate 36 and where the height H36 of the triangle is about 100 nm, the wavelength $\lambda_L$ of the laser light is preferably near 600 nm.

The size of the laser diode 40 is, for example, the width (W40) of 200-350 μm, the length (depth L40) of 250-600 μm, and the thickness (T40) of about 60-200 μm, as described above. The width W40 of the laser diode 40 can be decreased, for example, to about 100 μm, while the minimum thereof is a spacing between opposed ends of the current blocking layer 40h. However, the length of the laser diode 40 is the quantity associated with the electric current density and thus cannot be decreased so much. In either case, the laser diode 40 is preferably dimensioned in a sufficient size, in consideration of handling during mounting.

A power supply in the hard disk drive can be used for driving of this laser diode 40. In practice, the hard disk drive is usually equipped, for example, with the power supply of about 2 V, which is a sufficient voltage for the lasing operation. The power consumption of the laser diode 40 is also, for example, approximately several ten mW, which the power supply in the hard disk drive can fully provide.

In FIG. 4, the n-electrode 40a of the laser diode 40 is fixed to the electrode pad 47 by the solder layer 42 such as AuSn. The laser diode 40 is fixed to the light source support substrate 230 so that the output end 400 of the laser diode 40 is directed downward in FIG. 4, i.e., so that the output end 400 becomes parallel to the bond surface 2300; whereby the output end 400 can face the entrance face 354 of the waveguide 35 of the slider 22. In practical fixing of the laser diode 40, for example, an evaporated film of AuSn alloy is deposited in the thickness of about 0.7-1 μm on the surface of the electrode pad 47, the laser diode 40 is mounted thereon, and thereafter it is heated to be fixed, to about 200-300° C. by a hot plate or the like under a hot air blower. As shown in FIGS. 2 and 8, the electrode pad 48 is electrically connected through a bonding wire to the p-electrode 40*j* of the laser diode 40. The electrode connected to the electrode pad 47 may also be the p-electrode 40*j*, instead of the n-electrode 40*a*, and in this case, the n-electrode 40*a* is connected through a bonding wire to the electrode pad 48.

In the case of soldering with the aforementioned AuSn alloy, the light source unit is heated, for example, to the high temperature of about 300° C., but according to the present embodiment, this light source unit 23 is produced separately from the slider 22; therefore, the magnetic head portion in the slider is prevented from being adversely affected by this high temperature.

The back surface 2201 of the aforementioned slider 22 and the bond surface 2300 of the light source unit 23 are bonded, for example, with an adhesive layer 44 such as a UV cure type adhesive, as shown in FIG. 4, and the output end 400 of the laser diode 40 is arranged opposite to the entrance face 354 of the waveguide 35.

The configurations of the laser diode 40 and the electrode pads do not always have to be limited to those in the above-described embodiment, of course, and, for example, the laser diode 40 may be one of another configuration using other semiconductor materials, such as GaAlAs type materials. Furthermore, it is also possible to use any other brazing material, for the soldering between the laser diode 40 and the electrodes. Yet furthermore, the laser diode 40 may be formed directly on the unit substrate by epitaxially growing the semiconductor materials.

The sizes of the slider 22 and the light source unit 23 are arbitrary, but the slider 22 may be, for example, a so-called femtoslider having the width of 700 μm in the track width direction×length (depth) of 850 μm×thickness of 230 μm. In this case, the light source unit 23 can have the width and length approximately equal to them. In fact, for example, the typical size of the ordinary laser diode is approximately the width of 250 μm×length (depth) of 350 μm×thickness of 65 μm, and the laser diode 40 of this size can be adequately mounted, for example, on the side surface of the light source support substrate 230 of this size. It is also possible to make a groove in the bottom surface of the light source support substrate 230 and locate the laser diode 40 in this groove.

The spot of the far field pattern of the laser light reaching the entrance face 354 of the waveguide 35 can be made in the size in the track width direction, for example, of about 0.5-1.0 μm and the size perpendicular to the foregoing size, for example, of about 1-5 μm. In correspondence thereto, the thickness T35 of the waveguide 35 receiving this laser light is preferably, for example, about 2-10 μm so as to be larger than the spot and the width (W35) in the track width direction of the waveguide 35 is preferably, for example, about 1-200 μm.

The heat insulation layer 230*a* may be formed on the back surface 2201 of the slider substrate 220, and the present invention can also be carried out without the heat insulation layer.

(Production Method)

Subsequently, a method of producing the thermally assisted magnetic head described above will be described below briefly.

First, the slider 22 is produced. Specifically (with reference to FIG. 4), the slider substrate 220 is prepared, the MR effect element 33 and interelement shield layer 148 are formed by well-known methods, and a part (38*a* hereinafter) of the insulating layer 38 of $Al_2O_3$ or the like is further formed as a ground layer.

Figure 10A:
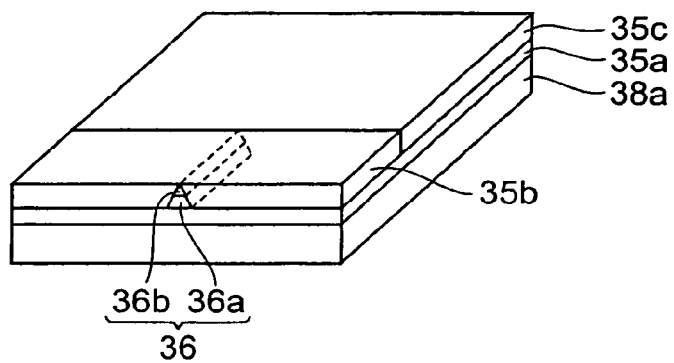
FIGS. 10(A)-(C) are perspective views, subsequent to FIG. 9, showing the production method of the waveguide and the near-field light generator plate in order of FIGS. 10(A)-(C).
Figure 10B:
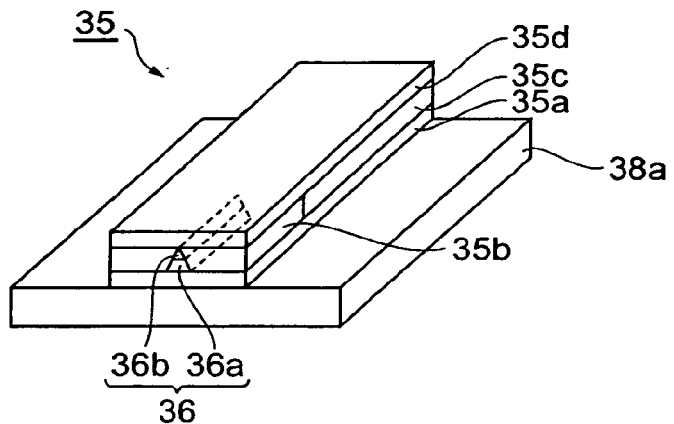
Figure 10C:
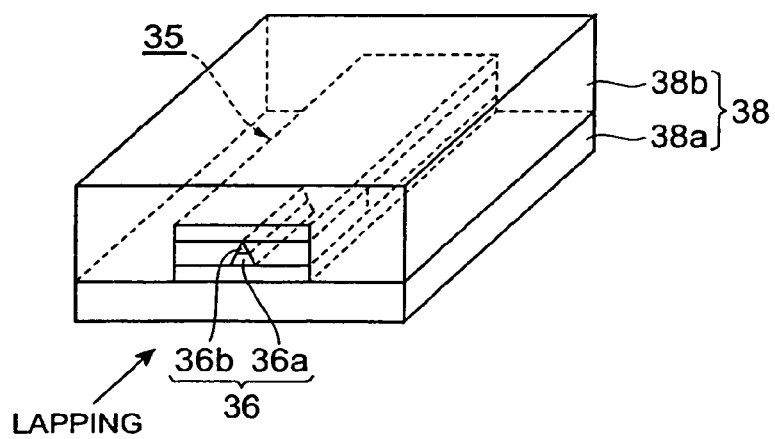

Subsequently, the waveguide 35 and near-field light generator plate 36 are formed. This process will be described in detail with reference to FIGS. 9 and 10. FIGS. 9 and 10 are perspective views to illustrate an embodiment of the method of forming the waveguide 35 and the near-field light generator plate 36.

In the first step, as shown in (A) of FIG. 9, a dielectric film 35*a* of $Ta_2O_5$ or the like with the refractive index higher than that of the insulating layer 38*a*, which will be a part of the waveguide 35, is first deposited on the insulating layer 38*a* of $Al_2O_3$ or the like, and the electroconductive layer 36*a* and the electroconductive layer 36*b* are deposited thereon, and a resist pattern 1002 depressed for liftoff in the bottom part is formed thereon. The electroconductive layers 36*a* and 36*b* are made of their respective electroconductive materials different from each other.

In the next step, as shown in (B) of FIG. 9, unnecessary portions of the electroconductive layers 36*a* and 36*b* are removed except immediately below the resist pattern 1002 by ion milling or the like, thereby forming a laminate for near-field light generator plate 36 which has a trapezoid sectional shape wider in the bottom and which consists of the electroconductive layers 36*a* and 36*b*, on the dielectric film 35*a*.

In the subsequent step, as shown in (C) of FIG. 9, the resist pattern 1002 is removed, and then a part of each slope is removed from the two slope sides of the laminate for near-field light generator plate 36 of the trapezoid shape by ion milling or the like, to form the laminate for near-field light generator plate 36 in a triangular sectional shape.

Subsequently, as shown in (D) of FIG. 9, a dielectric film 35*b* of the same material as the dielectric film 35*a* is deposited on the dielectric film 35*a* so as to cover the laminate for near-field light generator plate 36, a resist pattern 1003 for formation of the end face of the laminate for near-field light generator plate 36 is laid on the side where the medium-facing surface will be formed, the laminate for near-field light generator plate 36, dielectric film 35*c* and the dielectric film 35*b* are removed by ion milling or the like, from the side opposite to the side where the medium-facing surface will be formed, as shown in (A) of FIG. 10, and thereafter a dielectric film 35*c* of the same material as the dielectric film 35*b* is deposited on the removed portion.

Furthermore, as shown in (B) of FIG. 10, a dielectric film 35*d* of the same material as the dielectric film 35*b* is further deposited on the dielectric films 35*b*, 35*c*, and the dielectric films 35*a*, 35*b*, 35*c*, 35*d* are patterned so as to achieve a predetermined width, thereby almost completing the waveguide 35.

Thereafter, as shown in (C) of FIG. 10, an insulating layer 38*b* of the same material as the insulating layer 38*a* is further formed so as to cover the waveguide 35, thereby completing the insulating layer 38 as a cladding layer. Then the surface is removed by a predetermined distance from the side where the laminate for near-field light generator plate 36 is exposed, to form the near-field light generator plate 36 of the predetermined thickness, and the medium-facing surface S.

This surface removing method is not particularly limited and is, for example, a step of removing the surface on the medium-facing surface side by a predetermined thickness by any one of various methods, e.g., lapping (polishing) methods such as mechanical polishing and chemical mechanical polishing (CMP), etching methods such as ion beam etching, plasma etching, reactive ion etching, and chemical etching, and arbitrary combinations of these. Since in the near-field light generator plate 36 the electroconductive layers 36a and 36b are made of their respective electroconductive materials different from each other, there is the difference between their surface removal speeds (polishing speeds, etching speeds, or the like), whereby the fine level difference D shown in FIG. 7(B) can be readily made between the electroconductive layer 36a and the electroconductive layer 36b.

The combination of the electroconductive materials of the electroconductive layers 36a and 36b is preliminarily determined to be a combination realizing the mutually different surface removal speeds in the surface removing method, according to the method of removing the surface of the medium-facing surface. Namely, a layer of an electroconductive material with a relatively low surface removal speed is located in the portion expected to project toward the medium and a layer of an electroconductive material with a relatively high surface. removal speed is located in the portion expected not to project toward the medium. Specifically, for example, in the lapping case, electroconductive materials with mutually different hardnesses are used; and in the etching case electroconductive materials with mutually different etching speeds are used.

A preferred combination of compositions of electroconductive materials is such that the surface removal speed of the electroconductive layer 36a farther from the main magnetic pole 340 of the near-field light generator plate 36 is larger than the surface removal speed of the electroconductive layer 36b closer to the main magnetic pole 340. For example, from the viewpoint of making the difference between polishing speeds or hardnesses, a preferred combination is such that the electroconductive layer 36a farther from the main magnetic pole 340 in the near-field light generator plate 36 is made of Au and the electroconductive layer 36b closer to the main magnetic pole 340 is made of AuCu.

The above steps can form the waveguide 35 with the near-field light generator plate 36.

After that, the electromagnetic coil element 34 is formed by the well-known method as shown in FIG. 4, and then the insulating layer 38 of alumina or the like is formed. Furthermore, the electrode pads 371 and others for connection are formed and thereafter lapping of the air bearing surface and the back surface thereof is performed to complete the slider 22. After this step, tests of the electromagnetic coil element 34 and the MR effect element 33 of slider 22 are conducted for each slider, to select a nondefective product.

Subsequently, the light source unit 23 is produced. In the first step, as shown in FIG. 4, the light source support substrate 230 of AlTiC or the like is prepared, the heat insulation layer 230a, insulating layer 41, and electrode pads 47, 48 are formed on the surfaces of the substrate by well-known methods, the laser diode 40 is fixed on the electrode pad 47 by an electrically conductive solder material such as AuSn, and thereafter the substrate is shaped into a predetermined size by separation by cutting of the substrate, or the like. This completes the light source unit 23. The light source unit obtained in this manner is also subjected to characteristic evaluation of the laser diode, particularly, observation of a profile of drive current by a high-temperature continuous conduction test, to select one considered to have a sufficiently long life.

Figure 11A:
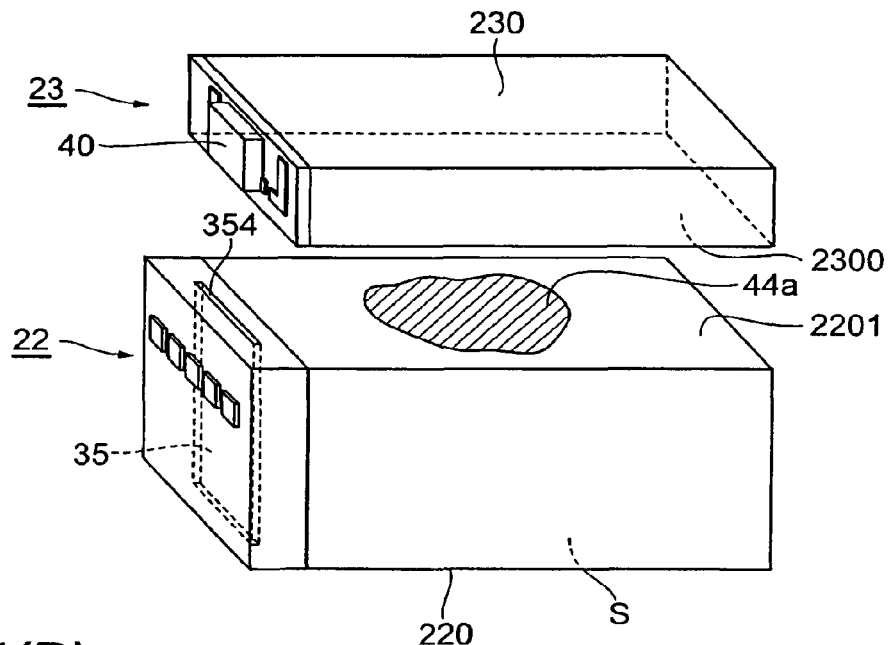
FIGS. 11(A) and (B) are perspective views showing a production method of the thermally assisted magnetic head in order of FIGS. 11(A) and (B).
Figure 11B:
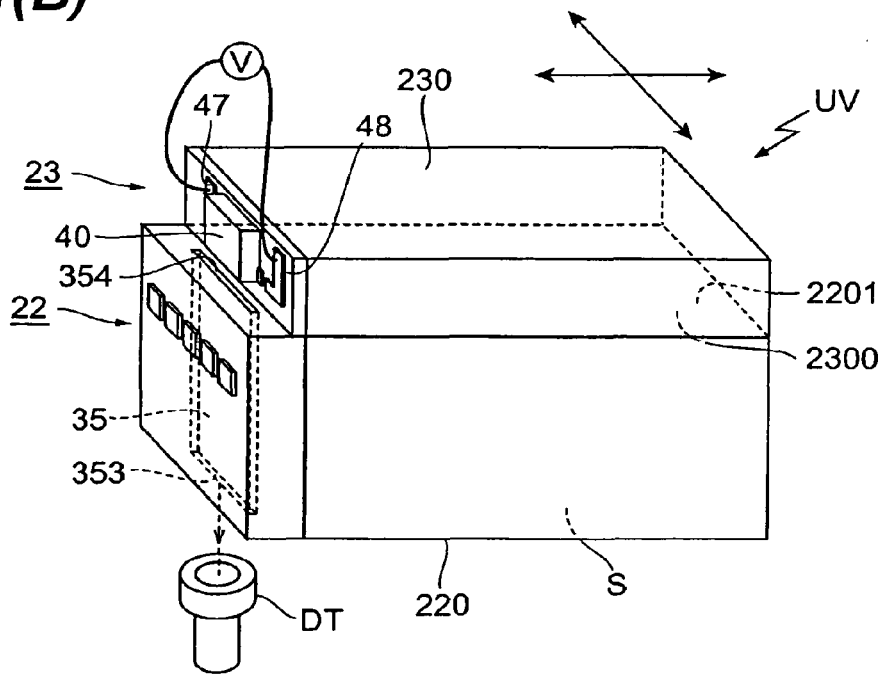

After that, as shown in (A) of FIG. 11, a UV cure type adhesive 44a is applied onto either or both of the bond surface 2300 of the light source unit 23 as a nondefective unit and the back surface 2201 of the slider 22 as a nondefective unit. The UV cure type adhesive can be a UV cure type epoxy resin, a UV cure type acrylic resin, or the like. The adhesion between the light source unit 23 and the slider 22 can also be implemented with an adhesive except for the UV cure type adhesive, e.g., with a solder layer of AuSn or the like which was used for adhesion between the laser diode 40 and the electrode pad 47.

Then, as shown in (B) of FIG. 11, the bond surface 2300 of the light source unit 23 and the back surface 2201 of the slider 22 are laid on each other, and then the laser diode 40 is activated with application of a voltage between the electrode pads 47, 48, and a photodetector DT is opposed to the exit face 353 of the waveguide 35. The light source unit 23 and the slider 22 are relatively moved in directions of arrows in (B) of FIG. 11 to find out a position where the output from the photodetector DT becomes maximum. At that position, UV light is applied from the outside onto the UV cure type adhesive to cure the UV cure type adhesive 44a, which can bond the light source unit 23 and the slider 22 to each other in a state in which the optical axis of the laser diode is aligned with the optical axis of the waveguide 35.

(Action)

Subsequently, the action of the thermally assisted magnetic head 21 according to the present embodiment will be described below.

During a writing or reading operation, the thermally assisted magnetic head 21 hydromechanically floats up by a predetermined levitation amount above the surface of the rotating magnetic disk (medium) 10. On this occasion, the ends on the medium-facing surface S side of the MR effect element 33 and the electromagnetic coil element 34 are opposed through a small spacing to the magnetic disk 10, thereby implementing readout by sensing of a data signal magnetic field and writing by application of a data signal magnetic field.

On the occasion of writing of a data signal, the laser light having propagated from the light source unit 23 through the waveguide 35 reaches the near-field light generator plate 36, whereupon the near-field light generator plate 36 generates the near-field light. This near-field light enables execution of thermally assisted magnetic recording as described below.

Here the near-field light generally has the maximum intensity at the border of the near-field light generator plate 36 when viewed from the medium-facing surface S, though it depends upon the wavelength of the incident laser light and the shape of the waveguide 35. Particularly, the present embodiment is arranged as follows in FIG. 4: the stack direction of the laser diode 40 is the horizontal direction in FIG. 4; the electric field vector of the light arriving at the near-field light generator plate 36 is the horizontal direction in FIG. 4, i.e., the vertical direction in FIG. 5. Furthermore, since in the present embodiment the electroconductive layer 36b including the cusp portion 36c projected in the direction of the electric field vector is projected more toward the medium than the electroconductive layer 36a as shown in FIGS. 7(A) and (B), radiation of the strongest near-field light occurs near the cusp portion 36c of the electroconductive layer 36b, whereby the near-field light can be prevented from being radiated from the edges and corners of the electroconductive layer 36a. In the thermal assist action to heat the recording layer portion of the magnetic disk with light, the portion facing the neighborhood of this cusp portion 36c becomes a main heat-acting area.

Since the electric field intensity of this near-field light is immeasurably stronger than that of the incident light, this very strong near-field light rapidly heats the opposed local part of the surface of the magnetic disk. This reduces the coercivity of this local part to a level allowing writing with the writing magnetic field, whereby writing with the electromagnetic coil element 34 becomes feasible even with use of the magnetic disk of high coercivity for high-density recording. The near-field light penetrates, for example, to the depth of about 10-30 nm from the medium-facing surface S toward the surface of the magnetic disk. Therefore, under the present circumstances where the levitation amount is 10 nm or less, the near-field light can reach the recording layer part sufficiently. The width in the track width direction and the width in the medium-moving direction of the near-field light generated in this manner are approximately equal to the aforementioned reach depth of the near-field light, and the electric field intensity of this near-field light exponentially decreases with increase in the distance; therefore, the near-field light can heat the recording layer part of the magnetic disk in an extremely localized area.

By adopting the thermally assisted magnetic recording as described above, it also becomes feasible to achieve, for example, the recording density of 1 Tbits/in$^2$ order, by performing writing on the magnetic disk of high coercivity by means of the thin film magnetic head for perpendicular magnetic recording to record recording bits in an extremely fine size.

The present embodiment uses the light source unit 23, so that the laser light propagating in the direction parallel to the layer surface of the waveguide 35 can be made incident to the entrance face (end face) 354 of the waveguide 35 of the slider 22. Namely, the laser light of appropriate size and direction can be surely supplied in the thermally assisted magnetic head 21 having the configuration in which the integration surface 2202 and the medium-facing surface S are perpendicular to each other. As a result, it is feasible to implement the thermally assisted magnetic recording with high heating efficiency of the recording layer of the magnetic disk.

Since in the present embodiment the magnetic head portion 32 is fixed to the slider substrate 220 and the laser diode 40 as the light source is separately fixed to the light source support substrate 230, the thermally assisted magnetic head 21 as a nondefective product can be produced with a good yield by individually testing each of the electromagnetic coil element 34 fixed to the slider substrate 220 and the laser diode 40 fixed to the light source support substrate 230, and thereafter fixing the slider 22 as a nondefective unit and the light source unit 23 as a nondefective unit to each other.

Since the magnetic head portion 32 is disposed on the side surface of the slider substrate 220, the electromagnetic coil element 34, the MR effect element 33, and others of the magnetic head portion 32 can be readily formed by the production methods of the conventional thin film magnetic heads.

Furthermore, since the laser diode 40 is located at the position apart from the medium-facing surface S and near the slider 22, it is feasible to suppress the adverse effect of the heat generated from the laser diode 40, on the electromagnetic coil element 34, the MR effect element 33, etc., and the possibilities of contact or the like between the laser diode 40 and the magnetic disk 10, to reduce the propagation loss of light because of the dispensability of an optical fiber, a lens, a mirror, etc., and to simplify the structure of the entire magnetic recording apparatus.

The arrangement method of the laser diode 40 is not limited to the above description, but it is also possible to adopt an arrangement way wherein the slider substrate 220 and the light source support substrate 230 are integrally formed, or an arrangement way wherein an optical fiber or the like is used to guide the light from the laser diode 40 to the waveguide 35 and the near-field light generator plate 36. Furthermore, the present invention can also be carried out by arranging the waveguide 35 and the near-field light generator plate 36 on the medium-facing surface of the slider substrate 220.

The electromagnetic coil element 34 may be one for longitudinal magnetic recording. In this case, a lower magnetic pole layer and an upper magnetic pole layer are provided instead of the main magnetic pole layer 340 and the auxiliary magnetic pole layer 344, and a writing gap layer is interposed between the ends on the medium-facing surface S side of the lower magnetic pole layer and the upper magnetic pole layer. Writing is implemented with a leakage magnetic field from the position of this writing gap layer.

The shape of the near-field light generator plate 36 is not limited to the one described above, either, and the present invention can also be carried out, for example, by a trapezoid shape in which the tip of the cusp portion 36c is somewhat flat, instead of the triangular shape. The present invention can also be carried out by a so-called "bow tie type" structure in which a pair of sheets of a triangular shape or a trapezoidal shape are opposed to each other with their cusp portions being spaced by a predetermined distance. In this "bow tie type" structure, a very strong electric field is concentrated in the central region thereof. In either case, the point is that the different materials are used for the portion where the near-field light is expected to be generated and for the other portion in the near-field light generator plate and that the portion where the near-field light is expected to be generated is projected more toward the medium than the other portion. For example, in the trapezoid case, the materials can be selected so that the cusp portion (upper base side) is projected more toward the medium than the other portion (lower base side). In the case of the bow tie structure in which a pair of plates are arranged, the materials can be selected so that the cusp portions of the respective plates are projected more toward the medium than the other portions of the respective plates.

Figure 12:
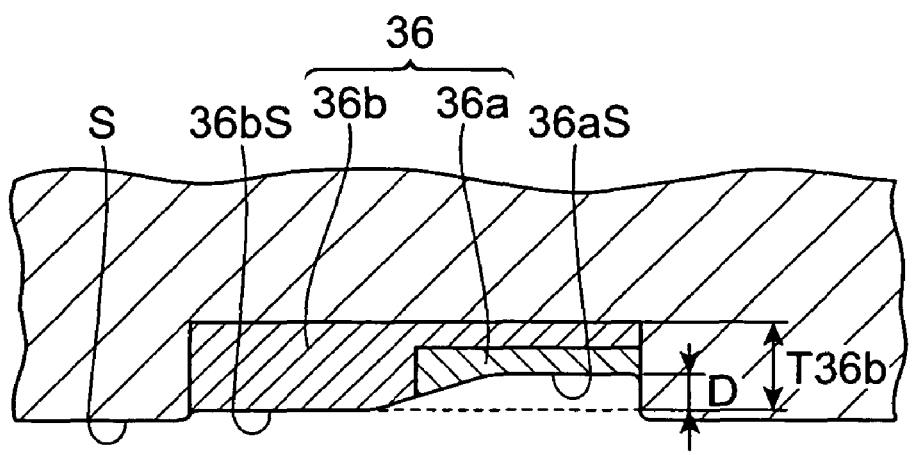
FIG. 12 is a horizontal sectional view showing another form of the near-field light generator plate.

In the near-field light generator plate 36, the whole in the thickness direction perpendicular to the medium-facing surface S does not have to be made from the same material but it is also possible to adopt, for example as shown in FIG. 12, a configuration wherein the medium-facing surface side is comprised of two electroconductive layers 36a, 36b of respective electroconductive materials different from each other and wherein the side other than the medium-facing surface is comprised of one electroconductive layer 36b. Namely, the point is that there are two electroconductive layers of mutually different electroconductive materials in the medium-facing surface S. It is also possible to adopt a configuration wherein there are three or more electroconductive layers instead of the two electroconductive layers.

The production method of the near-field light generator plate before the surface removing step is not limited to the above-described one, either, and it is also possible to adopt, for example, a method of forming a trench for receiving the near-field light generator plate, in the end face of the waveguide by milling or the like from the medium-facing surface side, and putting an electroconductive material in the trench by sputtering or the like.

It should be noted that the above-described embodiments all were described as illustrative of the present invention but not restrictive of the invention, and that the present invention can also be carried out in a variety of other modification and change forms. Therefore, the scope of the present invention should be defined by the scope of claims and scope of equivalents thereof only.

What is claimed is:

1. A near-field light generator plate which is arranged so that a principal surface thereof faces a medium, and in which one portion and other portion in the principal surface are made of respective electroconductive materials different from each other, wherein each of the electroconductive materials is a metal or an alloy of two or more metals selected from a metal group consisting of Pd, Pt, Rh, Ir, Ru, Au, Ag, Cu, and Al.

2. The near-field light generator plate according to claim 1, wherein the one portion is projected more toward the medium than the other portion.

3. A thermally assisted magnetic head comprising:
a magnetic pole for generating a magnetic field, which is exposed in a medium-facing surface;
a waveguide for receiving light from the outside and guiding the light to the medium-facing surface; and
the near-field light generator plate as defined in claim 1, which is disposed on a medium-facing surface of the waveguide.

4. A head gimbal assembly comprising:
the thermally assisted magnetic head as defined in claim 3; and
a suspension supporting the thermally assisted magnetic head.

5. A hard disk drive comprising:
the head gimbal assembly as defined in claim 4; and
a magnetic recording medium.

6. A near-field light generator plate which is arranged so that a principal surface thereof faces a medium, and
in which one portion and other portion in the principal surface are made of respective electroconductive materials different from each other, wherein the electroconductive material of the one portion has a higher hardness or a lower etching speed than the electroconductive material of the other portion, wherein the one portion is made of AuCu and the other portion is made of Au.

7. The near-field light generator plate according to claim 6, wherein, when viewed from a direction normal to a medium-facing surface, the one portion has a cusp portion.

8. A thermally assisted magnetic head comprising:
a magnetic pole for generating a magnetic field, which is exposed in a medium-facing surface;
a waveguide for receiving light from the outside and guiding the light to the medium-facing surface; and
the near-field light generator plate as defined in claim 6, which is disposed on a medium-facing surface of the waveguide, wherein in the medium-facing surface, the one portion of the near-field light generator plate is closer to the magnetic pole than the other portion thereof.

9. A head gimbal assembly comprising:
the thermally assisted magnetic head as defined in claim 8; and
a suspension supporting the thermally assisted magnetic head.

10. A hard disk drive comprising:
the head gimbal assembly as defined in claim 9; and
a magnetic recording medium.

11. A thermally assisted magnetic head comprising:
a magnetic pole for generating a magnetic field, which is exposed in a medium-facing surface;
a waveguide for receiving light from the outside and guiding the light to the medium-facing surface; and
the near-field light generator plate as defined in claim 6, which is disposed on a medium-facing surface of the waveguide.

12. A head gimbal assembly comprising:
the thermally assisted magnetic head as defined in claim 11; and
a suspension supporting the thermally assisted magnetic head.

13. A hard disk drive comprising:
the head gimbal assembly as defined in claim 12; and
a magnetic recording medium.

* * * * *